United States Patent
Schneider et al.

[11] Patent Number: 6,019,086
[45] Date of Patent: Feb. 1, 2000

[54] REDUNDANT SENSOR APPARATUS FOR DETERMINING ENGINE SPEED AND TIMING VALUES

[75] Inventors: Matthew L. Schneider; William A. Monette, both of Columbus, Ind.

[73] Assignee: Cummins Engine Co. Inc., Columbus, Ind.

[21] Appl. No.: 09/086,925

[22] Filed: May 28, 1998

[51] Int. Cl.[7] .................................................. G01M 15/00
[52] U.S. Cl. ........................ 123/406.61; 123/406.18; 123/617; 324/174
[58] Field of Search .................... 123/617, 406.58, 123/406.61, 406.18; 73/116, 117.3; 324/173, 174, 179

[56] References Cited

U.S. PATENT DOCUMENTS

| | | |
|---|---|---|
| 2,988,650 | 6/1961 | Weiss . |
| 3,419,798 | 12/1968 | Walton . |
| 4,093,917 | 6/1978 | Haenssermann . |
| 4,369,405 | 1/1983 | Sato et al. . |
| 4,378,004 | 3/1983 | Petrie .................................. 123/406.61 |
| 4,485,784 | 12/1984 | Fujii et al. .......................... 123/406.18 |
| 4,518,918 | 5/1985 | Avery . |
| 4,692,702 | 9/1987 | Huschelrath et al. . |
| 4,737,710 | 4/1988 | Van Antwerp et al. . |
| 4,810,967 | 3/1989 | Yokoyama et al. . |
| 4,847,527 | 7/1989 | Dohogne . |
| 4,857,842 | 8/1989 | Sturman et al. . |
| 4,859,941 | 8/1989 | Higgs et al. . |
| 4,875,011 | 10/1989 | Namiki et al. . |
| 4,935,698 | 6/1990 | Kawaji et al. . |
| 4,941,445 | 7/1990 | Deutsch ............................. 123/406.18 |
| 4,941,446 | 7/1990 | Denz et al. ......................... 123/406.18 |
| 5,084,674 | 1/1992 | Lachmann et al. . |
| 5,165,271 | 11/1992 | Stepper et al. . |
| 5,343,842 | 9/1994 | Fukui ................................. 123/406.18 |
| 5,577,485 | 11/1996 | Lindsley ................................. 123/617 |
| 5,694,040 | 12/1997 | Plagens . |
| 5,731,702 | 3/1998 | Schroeder et al. ...................... 123/617 |
| 5,782,210 | 7/1998 | Venturoli et al. .................. 123/406.61 |

*Primary Examiner*—Erick R. Solis
*Attorney, Agent, or Firm*—Baker & Daniels

[57] ABSTRACT

An engine control system includes a speed sensor apparatus for providing signals to an engine control module (ECM) indicative of the speed and timing of an internal combustion engine. The apparatus includes a primary and a secondary Hall device affixed to one pole of a dipole magnet. Independent flexible circuits connect each of the Hall devices to an output connector adapted to receive a cable connected to the ECM. The magnet, primary and secondary sensors and primary and secondary flexible circuits are potted and encased within a sensor housing that is configured for sealed mounting to a housing surrounding the timing wheel of the engine. The outputs from the two sensors are independent of each other and are simultaneously provided to the ECM. The ECM includes means for providing the output from the primary sensor to engine control routines utilizing speed and timing information while the primary sensor is operational. Means are also provided that derive a phase difference value between the primary and secondary outputs. In the event that the primary sensor fails, the ECM modifies the secondary sensor output by the phase difference value and provides the modified output to the engine control routines. In this manner, the engine control routines are provided with a consistent and continuous speed and timing signal even when one sensor fails.

19 Claims, 4 Drawing Sheets

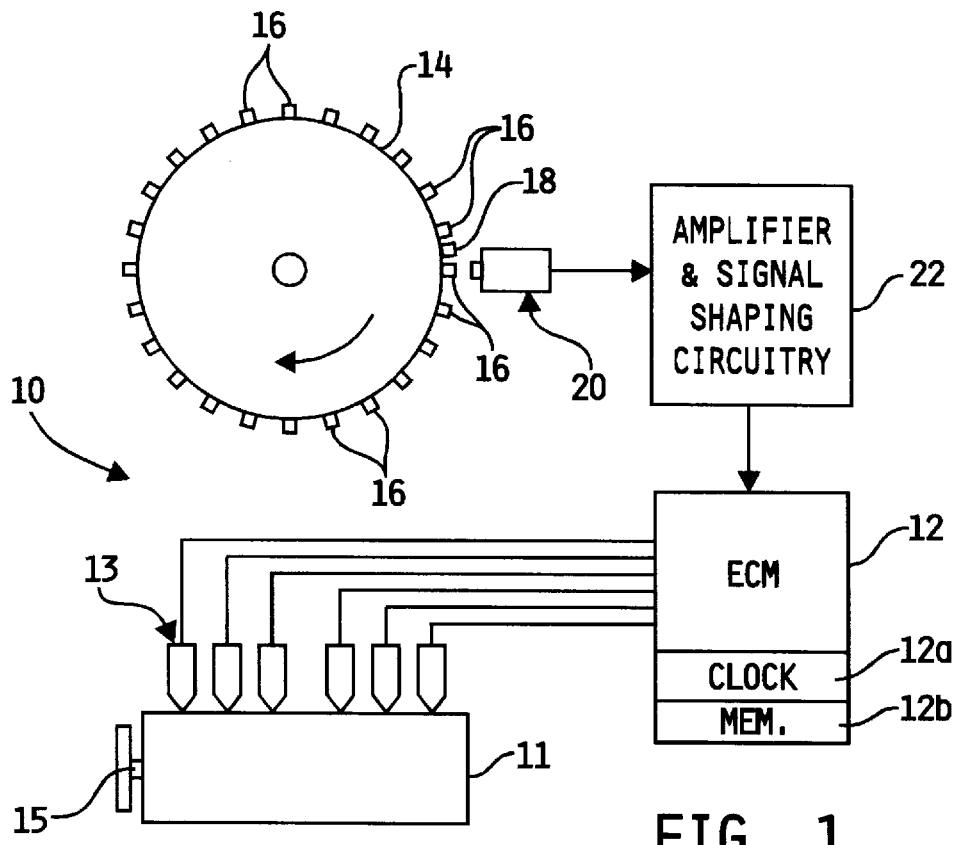
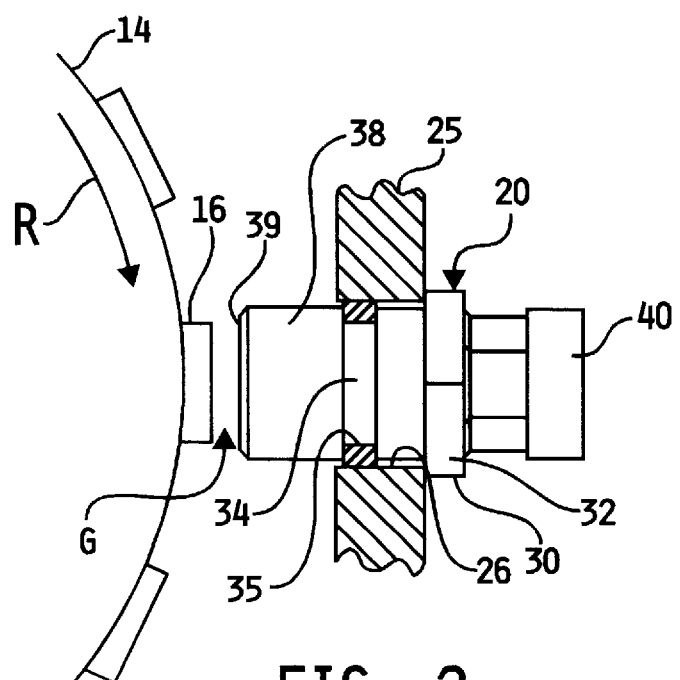

REDUNDANT SENSOR APPARATUS FOR DETERMINING ENGINE SPEED AND TIMING VALUES

BACKGROUND OF THE INVENTION

The invention relates to a sensor apparatus used for determining engine speed and timing values. More specifically, the invention contemplates a sensor apparatus for determining the rotational speed and/or position of a vehicle engine output shaft.

The invention is particularly well suited for use with vehicles having electronically controlled internal combustion engines. In vehicles of this type, an engine control module is utilized that is typically in the form of a small microprocessor that implements a variety of software-based routines to control the operation of the engine. In particular, the ECM can control the amount and rate of air and fuel flow into the engine cylinders, as well as the timing of ignition of the gas-fuel mixture in each of the engine cylinders. The ECM also administers various engine monitoring routines that record engine temperatures, operating speed and firing times.

With the advent of these electronic controls, sensing of engine speed and position has become critical to engine performance. In one particular application, a toothed wheel is driven by the engine. The rotation of the wheel is sensed by a sensor that provides signals to the ECM indicative of the rate of rotation of the wheel, and consequently the speed of the engine. Typically, the wheel includes a plurality of equiangularly spaced teeth, with an additional tooth being interposed as a shaft position.

Such a system is illustrated in FIG. 1. A vehicle engine system 10 includes an engine 11, which can be a diesel engine. An ECM 12 is provided for controlling the operation of the engine 11. Specifically, the ECM provides control signals to an array of fuel injectors 13, where the engine 11 is a diesel engine. The timing wheel 14 is driven by the engine output shaft 15 so that it rotates at the engine speed. A sensor assembly 20 is aligned with the teeth 16 of the timing wheel 14 so that the sensor assembly 20 generates a signal at each tooth passage. The timing wheel 14 can include an intermediate positioning tooth 18 that can provide a reference point for determining a top dead center position for the engine 11.

The sensor assembly 20 generates a signal each time one of the teeth 16 passes, which signal is fed to an amplifier and signal shaping circuitry 22. The output from the circuitry 22 is then provided to the engine control module 12. Generally, the signal produced by the sensor assembly 20 and the signal processor 22 can be readily used by a wide range of ECMs. Typically, the signal being passed from the shaping circuitry 22 to the ECM is in the form of a square wave. The ECM 12 can then include its own circuitry to sense either the leading or the trailing edge of the square wave signal received from the circuitry 22.

The ECM can also include appropriate circuitry for converting the analog signal to a digital signal that is usable by the timing routines implemented by the ECM. As illustrated in FIG. 1, the ECM also includes a clock for generating clock signals and a memory. The memory stores a variety of values that are used by the routines implemented by the ECM and values that are generated by the routines, such as engine speed. The data output by the ECM and stored in memory can be subsequently downloaded to provide historical information concerning the operation of the engine 11.

One problem encountered in certain vehicle engine systems, such as the system 10 shown in FIG. 1, is that the system is vulnerable to a failure of the sensor assembly 20. In order to accurately sense the passage of the teeth of the timing wheel 14, the sensor assembly 20 must be located in close proximity to the wheel, which means that the sensor assembly is immersed in the hostile, high temperature environment of the engine 11. Electronic components in this environment are prone to failure unless adequately shielded; however, the amount of shielding necessary to protect the electronic components also interferes with the ability of the sensor to perform its function. Thus, in most vehicle engine systems, a single sensor is utilized and simply replaced when it fails. However, when the sensor fails no engine speed signals are being generated, which can mean a failure of the engine control routines that rely upon engine speed or timing data.

There remains a need, therefore, for a engine speed and timing sensing apparatus that does not suffer from these deficiencies, or that at least accounts for the likelihood of sensor failure sometime during the life of engine.

SUMMARY OF THE INVENTION

In order to address this problem, the present invention contemplates a redundant sensor apparatus in which a pair of engine speed sensors are mounted in close proximity alignment with an engine timing wheel having periodically spaced ferromagnetic elements configured for disrupting a magnetic flux surrounding the sensor apparatus. In the preferred embodiment, the sensor assembly includes a pair of Hall elements each mounted on an end of the same magnet. Each of the Hall elements is preferably a differential Hall device which itself includes a pair of Hall generators wired together to produce a differential voltage signal.

In accordance with the invention, the sensor assembly is mounted to a housing adjacent the timing wheel. The assembly is mounted to achieve an optimum air gap between the Hall sensors and the passing teeth of the timing wheel. The Hall sensors forming the sensor assembly are separated by a distance that is preferably less than the width of a timing wheel tooth.

In accordance with one aspect of the invention, the Hall elements are mounted to the end of a magnet. Each Hall element includes its own circuitry, which in one aspect of the invention comprises a flexible circuit mounted to the outside of the magnet. The flexible circuit can include signal conditioning elements as well as temperature compensation components. Preferably, the flexible circuits are encased in some form of EMF resistant cladding to reduce the risk of distortion of the output signal from each of the Hall elements.

In a further aspect of the invention, both the Hall elements and the magnet are encased within a sensor housing. The flexible circuitry for each of the Hall elements passes through the housing and connects with an array of connector sockets or pins at one end of the housing. The connector sockets or pins are configured to mate with a corresponding connector which then feeds the output signals to the engine control module. With this construction, the sensor assembly can be readily removed and replaced by simply disconnecting the mating connectors from each other and removing the sensor housing from its mounting position adjacent the timing wheel.

In one important feature of the invention, each of the Hall elements generates its own independent signal fed to the engine control module, with one element being designated primary and the other secondary. Preferably, the signals are conditioned to a uniform square wave using a Schmitt trigger and output transistor. In accordance with the invention, the engine control module includes circuitry and software that reads the output of the primary and secondary Hall elements and determines a phase difference between the two signals. This phase difference value is stored in memory in the ECM for later use. Under normal operating conditions, the ECM uses the signal generated by the primary Hall sensor to provide timing information for use by the ECM control routines. However, when the ECM detects a failure of the primary Hall sensor, the routines automatically utilize the square wave output signal from the secondary Hall sensor, as offset by the stored value for the phase difference. In this way, the redundant Hall sensor assembly maintains continuity in the timing signal utilized by the ECM, even on a failure of the primary Hall sensor. Preferably, the ECM includes means for generating an alert on the failure of either the primary or the secondary Hall sensor. This alert can notify the vehicle operator of the need to replace the sensor assembly because one of the Hall sensors has failed. Since timing signals are being provided by the secondary sensor element, the vehicle operator can continue operating the vehicle until the engine is brought in for service.

It is one object of the invention to provide a engine speed and timing sensing system that overcomes the problems presented by a failure of the speed sensor assembly. A further object of the invention is to present a sensor assembly that can be readily replaced upon the failure of one of the sensing elements. These objects and other objects and benefits of the invention can be discerned from the following written description and accompanying figures.

DESCRIPTION OF THE DRAWINGS

FIG. 1 is a schematic representation of a vehicle engine system into which the engine timing and speed sensor apparatus of the present invention is incorporated.

FIG. 2 is an enlarged side elevational view of an engine timing wheel and the engine speed sensor assembly in accordance with one embodiment of the present invention.

DESCRIPTION OF THE PREFERRED EMBODIMENT

Figure 3:
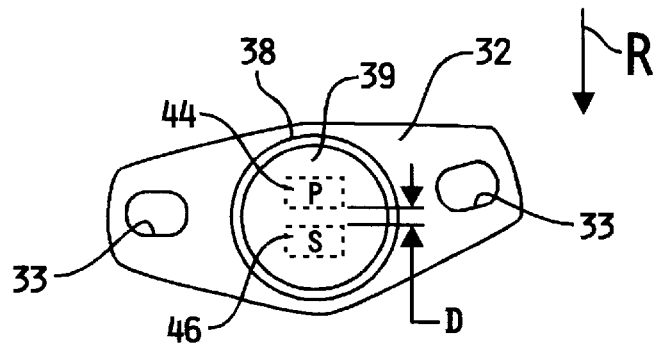
FIG. 3 is an end elevational view of one end of the sensor assembly shown in FIG. 2 depicting the end immediately adjacent the timing wheel.

For the purposes of promoting an understanding of the principles of the invention, reference will now be made to one preferred embodiment illustrated in the drawings and specific language will be used to describe the same. It will nevertheless be understood that no limitation of the scope of the invention is thereby intended, such alterations and further modifications in the illustrated embodiment, and such further applications of the principles of the invention as illustrated therein being contemplated as would normally occur to one skilled in the art to which the invention relates.

Figure 4:
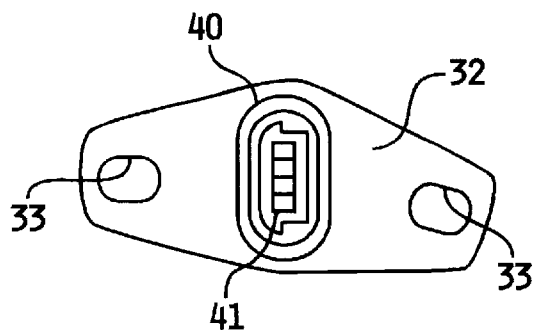
FIG. 4 is an end elevational view of the sensor assembly shown in FIG. 2, illustrating the opposite end of the assembly from that shown in FIG. 3., depicting the connector body component of the assembly.
Figure 5:
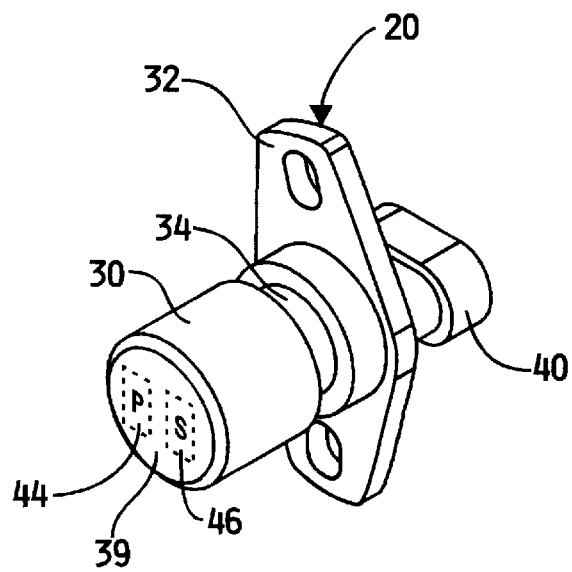
FIG. 5 is a top perspective view of the sensor assembly shown in FIGS. 2–4.

As depicted in FIG. 1, the vehicle engine system 10 includes a sensor assembly 20 that feeds signals to an engine control module 12. In accordance with the present invention, the sensor assembly 20 is mounted within a housing 25 associated with the timing wheel 14, as shown in FIG. 2. The sensor assembly 20 includes a housing 30 that is mounted to the timing wheel housing 25. In particular, the sensor housing 30 can include a mounting flange 32 that defines a pair of fastener openings 33, as best seen in FIGS. 3 and 4. The openings 33 are configured to receive a conventional threaded fastener, such as a machine screw or bolt, that are engaged in conventional threaded bores in the timing wheel housing 25. The sensor housing 30 projects through an opening 26 in the housing 25 and is held in place by way of the mounting flange 32.

In the preferred embodiment, the sensor housing 30 defines a seal ring groove 34 spaced from the mounting flange 32. A seal ring 35 is mounted within the groove 34 to provide an environmental seal between the sensor housing 30 and the timing wheel housing 25. Preferably, the seal ring 35 is in the form of an elastomeric O-ring that is compressed between the housing 25 and the seal ring groove 34. The seal ring 35 is formed of a material capable of withstanding the operating temperature range of the engine without failure or cracking. The timing wheel housing can also define a groove corresponding to the seal ring groove 34 to help seat the seal ring 35 and provide a tight seal.

In the illustrated embodiment, the sensor housing 30 includes a sensor mounting body 38 and a connector body 40 at opposite ends of the housing. As illustrated in FIG. 2, the sensor mounting body 38 is disposed at the interior of the timing wheel housing 25, while the connector body 40 projects from the opposite side of the housing. The sensor mounting body 38 defines a sensor face 39 (see FIGS. 2 and 3) that is oriented toward the timing wheel 14. The sensor face 39 is separated from each tooth 16 of the timing wheel 14 by an air gap G. The width of the air gap G is determined by the type of sensors being used in the sensor assembly 20 and the desired sensitivity of the assembly. In one specific example in which the sensor assembly 20 utilizes Hall Effect devices, the air gap G is nominally 0.75-mm±0.50 mm. It is understood that other types of sensing devices may require different air gaps to generate an optimum and accurate output signal. The air gap can be adjusted by interposing washers or shims between the mounting flange 32 and the timing wheel housing 25.

At the other end of the sensor housing 30, the connector body 40 carries a connector array 41 as shown in FIG. 4. The connector array 41 can be of any conventional type, including connector prongs or receptacles, or male/female connectors. As described in more detail herein, the connector array 41 provides for electrical connection between the sensors and the engine control module by way of an appropriately configured cable.

In accordance with one aspect of the present invention, the sensor housing 30, and particularly the sensor mounting body 38, supports a pair of sensors, namely primary sensor 44 and secondary sensor 46. As seen in FIG. 3, the primary sensor 44 is positioned upstream of the secondary sensor 46 with respect to the direction of rotation of the timing wheel 14, as identified by the arrow R. In other words, each tooth 16 of the timing wheel 14 will pass by the primary sensor 44 first, followed by the secondary sensor 46. The two sensors are separated by a distance D. In one specific embodiment, this distance D is 2.0 mm. Preferably, the distance is less than the width of one tooth 16 of the timing wheel 14. More importantly, the distance D is significantly less than the pitch of the teeth 16 to ensure that one tooth has completely passed the primary and secondary sensors before the next tooth arrives at the sensor assembly.

Figure 6:
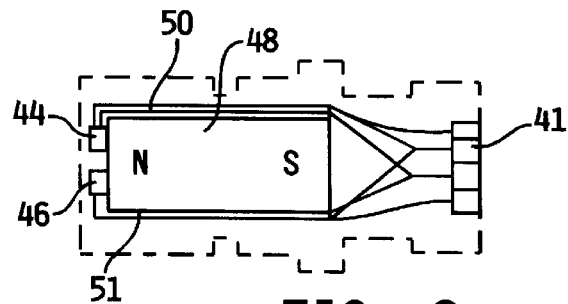
FIG. 6 is a side partial cross-sectional view of the sensor assembly shown in FIGS. 2–5, illustrating the internal components of the assembly.

In accordance with the preferred embodiment of the present invention, the primary sensor 44 and secondary sensor 46 are both Hall Effect sensors. Consequently, the sensors themselves are mounted at one end of a dipole magnet 51, as shown in FIG. 6. The magnet 51 can be of a conventional type usable with Hall Effect sensors. In specific embodiments, the magnet can be a samarium cobalt, Alnico VIII HE or other comparable magnet, depending upon the air gap and sensitivity requirements for the sensor assembly 20. The sensors 44 and 46 can be mounted at either the south pole or the north pole of the magnet 51. Preferably, the sensors are fixed to the end of the magnet by way of an adhesive or an epoxy.

Each of the two sensors includes its own flexible circuit providing electrical connection to the connector array 41. Specifically, primary sensor 44 includes a primary flexible circuit 50 that engages the array, while secondary sensor 46 is connected by way of a secondary flexible circuit 51. The flexible circuits are preferably affixed along the length of the magnet 48. In the preferred embodiment, each of the flexible circuits 50, 51 incorporate some form of EMI protection or cladding. The flexible circuits can include temperature compensation elements to account for variations in the output signal from the two sensors 44, 46 due to fluctuations in environmental temperature. It is envisioned that the components of the sensor assembly 20 will be subjected to temperatures ranging from −40° C. to +150° C. This wide range of temperatures can result in fluctuations in the output signals from each of the sensors, hence the need for some form of temperature compensation. The temperature compensation circuit can be of known design, provided that it can be incorporated into the flexible circuits 50 and 51. In addition to the temperature compensation feature, the flexible circuits can also include signal conditioning electrical components to optimize the square wave signal generated by the sensors and passed on to the ECM.

Figure 7:
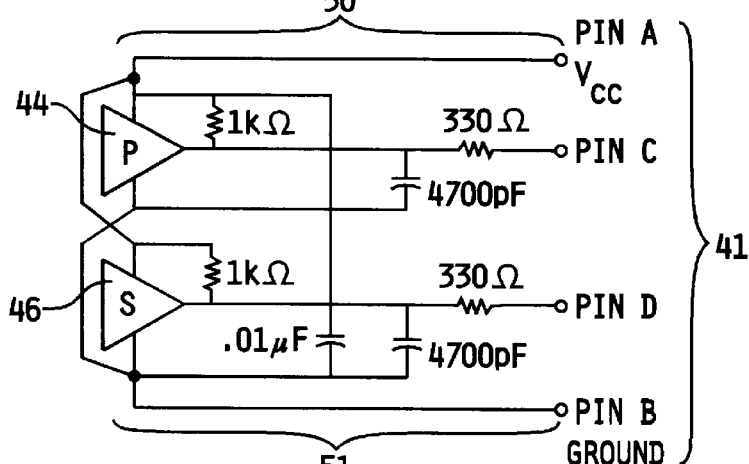
FIG. 7 is a circuit diagram of the circuitry associated with the sensor assembly of the present invention.

Certain components of the flexible circuits 50 and 51 are depicted in FIG. 7. Particularly, it can be seen that the AC coupled primary sensor 44 and secondary sensor 46 include an array of electrical resistors and capacitors between the output of the sensors and the connector array 41. As illustrated in this figure, one pin of the connector array 41, namely pin A, corresponds to the input voltage $V_{cc}$. Another pin, pin B, corresponds to ground. Pins C and D are the respective outputs of the two sensors 44 and 46. The signals at these output pins C and D are conditioned by way of the resistor and capacitance circuits incorporated into the flexible circuits 50 and 51. In a specific embodiment, the applied operating voltage $V_{cc}$ is nominally 5.0 volts with a supply current of 20.0 amps, and the resistance and capacitance values are calibrated to produce an equivalent output at pins C and D.

Figure 9:
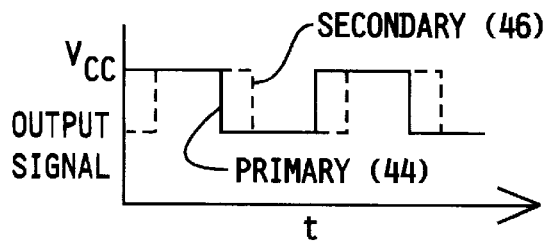
FIG. 9 is a graph showing the output signal generated by the primary and secondary sensing elements shown in the circuit diagram of FIG. 7.

The output at pins C and D is depicted in the graph in FIG. 9. In particular, it can be seen that the two sensors generate square wave signals with the peak voltage substantially equal to the applied voltage $V_{cc}$. The period of the square wave corresponds to the pitch of the teeth 16 on the timing wheel 14. In other words, each time one of the teeth 16 passes by the sensor assembly 20, the voltage output at pins C or D goes high, namely at $V_{cc}$. As can be seen in FIG. 9, the square waves between the primary sensor 44 and the secondary sensor 46 are offset or phase shifted relative to each other. In addition, it can be seen that the primary signal leads the secondary signal. The phase shift is a function of the distance D between the two sensors.

Figure 8:
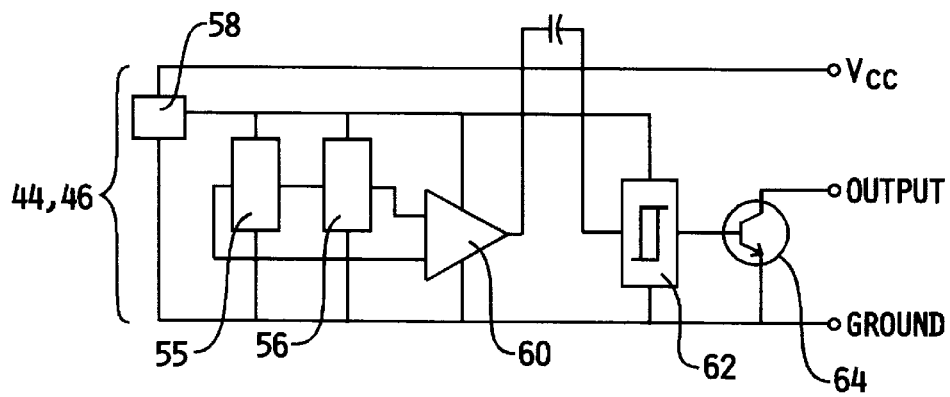
FIG. 8 is a circuit diagram of the individual sensing elements utilized as the primary and secondary elements shown in the circuit diagram of FIG. 7.

In the preferred embodiment, each of the sensors 44 and 46 are constituted as differential Hall sensors. In one specific embodiment, each of the sensors 44 and 46 are provided in the form of a small integrated circuit chip including the electrical components shown in FIG. 8. Particularly, it can be seen that the sensor includes a pair of Hall generators 55 and 56 incorporated into the chip. The input voltage $V_{cc}$ is applied to the inputs of the Hall generators 55, 56 through a voltage regulator 58. In addition, the two Hall generators are mutually connected to ground. As can be seen in FIG. 8, the series connected Hall generators 55, 56 have their differential outputs supplied to an amplifier 60 which is AC coupled to a Schmitt trigger 62. The Schmitt trigger 62 is electrically connected to an NPN transistor that changes state at the output upon receipt of a trigger signal from the Schmitt trigger 62 at the base of the transistor. The differential voltage produced by the two Hall generators 55, 56 activates the Schmitt trigger 62 at the passage of both the leading edge and the trailing edge of a tooth 16 of the timing wheel 14, which results in the square wave output shown in FIG. 9. In a specific embodiment, the circuit components of FIG. 8 are selected to sense tooth passage speeds of 30–2250 r.p.m. In this specific embodiment, the Hall generators and associated circuitry have an output rise time of about 17.0 $\mu$sec. and an output fall time of about 2.0 $\mu$sec.

In one embodiment, the signal conditioning components as shown in the circuit diagram of FIG. 8 are incorporated into an integrated circuit or DIP chip onto which the Hall generators 55 and 56 are mounted. Alternatively, the Hall generators themselves can be mounted to the end of the magnet 48 with the conditioning components 58, 60, 62 and 64 being incorporated into the flexible circuits 50, 51.

In a further aspect of the invention, the primary and secondary sensors 44 and 46, as well as the primary and secondary flexible circuits 50 and 51 are potted with an epoxy and then molded into a thermoplastic shell. The completed arrangement is then placed within the sensor housing 30. Preferably, the sensor housing 30 is cast or forged from a standard automotive metal, such as steel or aluminum.

In accordance with the present invention, two output signals are being generated simultaneously by the sensor assembly 20. As illustrated in the graph of FIG. 9, the signal from the secondary sensor 46 lags the primary sensor 44. The ECM 12 receives both signals by way of a cable connected to the connector array 41 in the sensor housing 30. In an important feature of the invention, both signals are continuously supplied to the ECM 12, although the speed and timing related routines conducted by the ECM rely, at least initially, upon the output from the primary sensor 44 alone. The output from the secondary sensor 46 is utilized in the event that the primary sensor 44 fails in some manner.

Figure 10:
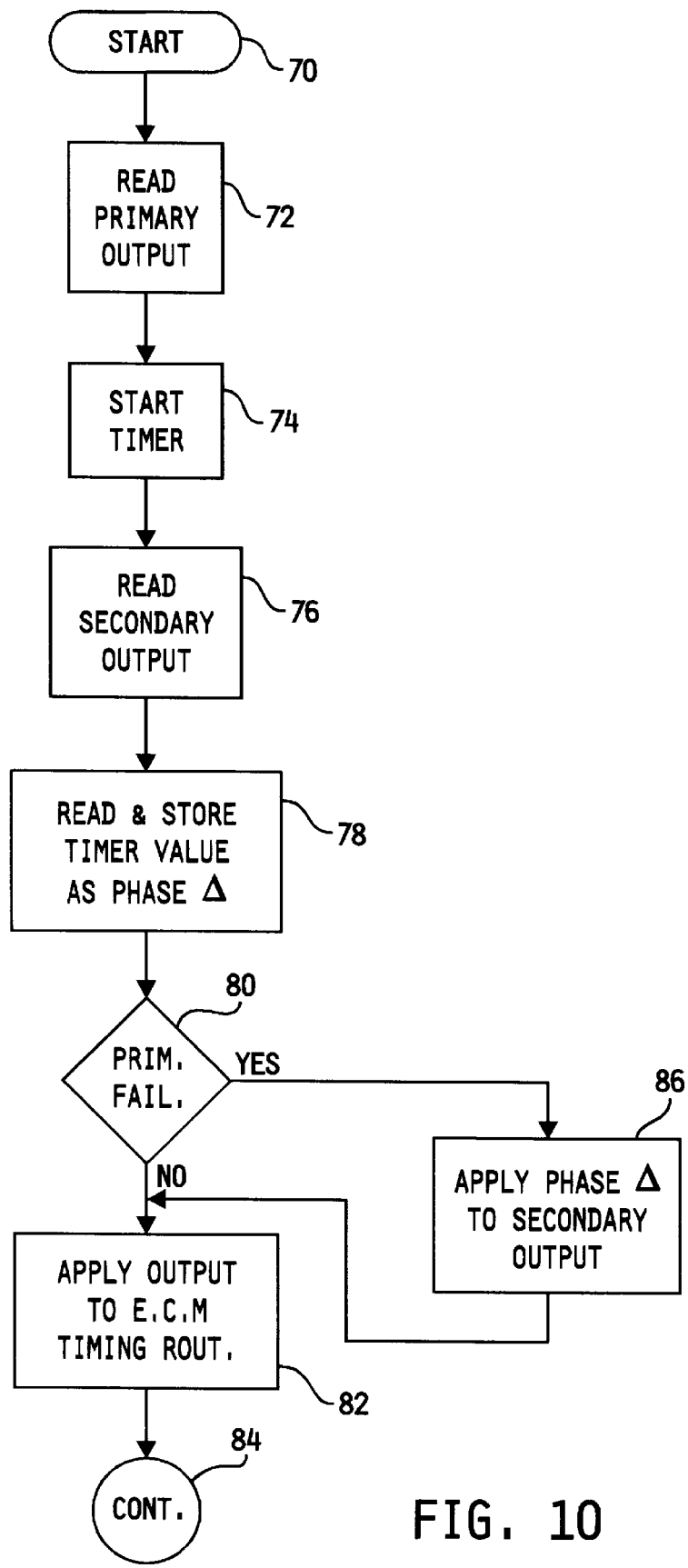
FIG. 10 is a flowchart illustrating one routine implemented by the engine control module for receiving and evaluating the output signals from the sensor assembly according to the illustrated embodiment.

The ECM 12 includes electronics and software for implementing steps of the flow chart shown in FIG. 10. After engine start up in step 70, the output of the primary sensor 44 is read in step 72. At that point, a timer is started in step 74 that receives pulses from the clock 12A of the ECM 12. The timer is terminated in step 76 when an output from the secondary sensor 46 at pin C of the connector array 41 is received. In the next step 78, the value of the timer is read and stored as a phase Δ. Preferably, the timer value is converted to an appropriate digital value that can be applied to the output of the secondary sensor 46 so that it can emulate an output from the primary sensor 44. This phase Δ can be stored in the memory 12b in the ECM 12, for later use by the timing and speed routines of the ECM.

In the next step 80, it is determined whether the primary sensor 44 has failed. Such a failure can be the result of several causes. For example, the Hall generator 55 can fail to properly respond to the change in magnetic flux upon passage of a tooth 16. In addition, the voltage input to the generator or the output from the sensor can fail to register. Temperature or EMI effects can cause a modification of the signal produced by the primary sensor 44. Preferably, the ECM includes some conditioning circuitry calibrated to compare the output of the primary sensor with the applied voltage $V_{cc}$ to determine if the primary sensor is operating improperly.

If the primary sensor 44 has not failed, the output at pin C of the connector array 41 is applied to the ECM timing routines in step 82. The entire sequence of steps can be continued or repeated at step 84. Alternatively, only steps 80 and 82 can be repeated with the phase Δ value being determined only at engine start up.

In the event that the test in step 80 is met, namely that the primary sensor 44 has failed, control passes to step 86. In this step, the ECM utilizes the output signal from pin D corresponding to the output from the secondary sensor 46. Since this signal from the secondary sensor is offset from the primary sensor, the phase Δ value is applied to the output of the secondary sensor 46 to emulate the signal from the primary sensor 44. In this instance, then, the control passes to steps 82 and 84 in which the output, now from the secondary sensor 46, is utilized by the ECM timing routines. The ECM can include a separate routine to convert the secondary output signal to a primary signal, which is then provided directly to the speed and timing routines. Alternatively, the speed and timing routines can make the conversion based on a trigger indicative of a failure of the primary sensor.

In the most preferred embodiment, the primary and secondary sensors comprise Hall generators 55 and 56. The Hall generators are preferred because they provide consistent output signals regardless of the speed of the rotating timing wheel 14. Moreover the phase difference between the outputs of the two sensors and the actual position of the timing wheel remains constant at all engine speeds. On the other hand, Hall generators are magnetically and electronically sensitive. In addition, Hall generators are more sensitive to harsh environments than other electromagnetic sensing elements. For example, a VR sensor can be utilized in the place of the differential Hall generators 55 and 56. Appropriate changes to the sensor housing 30 would have to be made in order to accommodate the bulkier VR sensor components. In addition, the outputs of the two VR sensors are speed dependent, and most particularly the phase difference between the two sensors is directly related to the sensed speed. Thus, in the steps 78 and 86 of the flowchart in FIG. 10, the stored phase Δ value would appear as an array with different phase Δs at different engine speeds. In step 86 the phase Δ to be applied to the signal from the secondary sensor 46 would be based upon the last sensed engine speed. Alternatively, the speed/phase relationship for a given sensor pair can be pre-determined and the engine control and timing routines calibrated accordingly. A table look-up routine can be incorporated into the ECM to obtain the phase Δ value at a specific engine speed.

In some circumstances, the engine speed determination is not sensitive to the phase difference between the outputs from the primary and secondary sensors. In other words, the engine speed routines rely upon the time that elapses between pulses of the speed sensor, so that it is irrelevant whether each pulse is phase shifted from the pulse output of the other sensor. On the other hand, the engine timing data is phase sensitive since the generation of a sensor pulse is calibrated to signify the passage of the timing tooth 18. The routines implemented by the ECM to identify the passage of the timing tooth, as opposed to one of the equiangularly spaced teeth 16, can also apply the phase Δ value to the secondary output signal.

In the preferred embodiment, the first sensor 44 is the designated the primary sensor, so that the ECM routines are keyed to the output from that sensor. In this instance, the phase Δ value is subtracted from the output of the secondary sensor 46 to emulate a signal from the now failed primary sensor 44. Alternatively, the second sensor 46 can be designated the lead or primary sensor. With this protocol, when the second, but lead, sensor 46 fails, the first sensor 44 will generate a signal earlier since each tooth of the timing wheel encounters the sensor 44 before the sensor 46. Consequently, the timing routines of the ECM can be modified to add the phase Δ value to the first sensor signal in the event that the second sensor fails. In this case, the phase advanced signal.

In the illustrated embodiment, the sensor assembly 20 senses the passage of the teeth 16, 18 of a timing wheel 14. Since the sensor assembly relies upon variations in the magnetic flux surrounding the sensor it is of course understood that at least the teeth of the timing wheel must be formed of some ferromagnetic material. In addition, while the preferred embodiment contemplates that the timing wheel will include projecting teeth, other configurations of the wheel are contemplated provided that the wheel can periodically disrupt the magnetic flux surrounding the sensor assembly 20. For example, the wheel can constitute a disc with periodic cut-outs at the perimeter of the disc. The disc can also be formed of a non-ferromagnetic material with ferromagnetic elements embedded within the disc.

While the invention has been illustrated and described in detail in the foregoing drawings and description, the same is to be considered as illustrative and not restrictive in character, it being understood that only preferred embodiments thereof have been shown and described and that all changes and modifications that come within the spirit of the invention are desired to be protected.

What is claimed is:

1. An engine control system for an internal combustion engine comprising:

an engine control module (ECM) having a microprocessor including means for implementing engine control routines operable to control the operation of a vehicle engine, some of said routines utilizing engine speed and timing information;

a timing wheel arranged to be driven by the vehicle engine, said timing wheel including a plurality of spaced ferromagnetic elements, each having a width;

a sensor apparatus mounted relative to said timing wheel to sense the passage of said ferromagnetic elements, said sensor apparatus including a primary magnetic sensor and an independent secondary magnetic sensor spaced apart a distance less than said width of said spaced ferromagnetic elements, each of said sensors producing corresponding independent output signals indicative of the passage of said ferromagnetic elements in the proximity of each sensor;

a connector engaged between said sensor apparatus and said ECM for providing said output signals from said primary and secondary sensors to said ECM;

wherein said ECM includes;

means for reading the primary output signal and for determining engine speed and timing information from the primary output signal from said primary sensor;

means for determining a phase difference value between said primary output signal from said primary sensor and the secondary output signal from said secondary sensor;

means for reading said secondary output signal, applying said phase difference value to modify said secondary output signal and determining engine speed and timing information from said modified secondary output signal upon a failure of said primary sensor; and means for providing the engine speed and timing information to the engine control routines.

2. The engine control system according to claim 1, wherein said means for determining a phase difference includes:

a digital timer within said microprocessor;

means for starting said timer on receipt of an output from said primary sensor;

means for stopping said timer on receipt of an output from said secondary sensor; and means for storing a phase difference value in a memory of said ECM based on the value of said timer.

3. The engine control system according to claim 1, wherein said primary sensor and secondary sensor include Hall generators.

4. The engine control system according to claim 3, wherein said primary sensor and secondary sensor include differential Hall sensors.

5. The engine control system according to claim 1, wherein said sensor apparatus includes a dipole magnet and said primary sensor and secondary sensor are mounted on one pole of said magnet.

6. The engine control system according to claim 5, wherein:

said sensor apparatus includes an electrical connector having a plurality of connection points and a pair of flexible circuits independently connecting said primary sensor and secondary sensor to said connector; and said connector includes a cable configured to engage said connection points.

7. The engine control system according to claim 6, wherein said flexible circuits are affixed to said magnet and extend along a length of said magnet to said connection points.

8. The engine control system according to claim 6, wherein said flexible circuits include cladding for protecting said circuits from electromagnetic interference.

9. An engine speed and timing sensor system for providing a signal indicative of engine speed and timing to engine control routines of an engine control module, comprising:

a dipole magnet having one sensing face at a pole of the magnet;

a primary magnetic sensor mounted on said one sensing face and configured to generate a first output signal indicative of the engine rotation speed and timing;

a secondary magnetic sensor mounted on said one sensing face disposed apart a fixed distance from said primary sensor and configured to generate a second output signal indicative of the engine speed and timing, wherein said second output signal lags said first output signal by a phase difference related to said fixed distance;

circuitry electrically connecting said first and second sensors to the engine control module;

means for determining a phase difference value between said second signal and said first signal and for storing said phase difference value in a memory within the ECM;

means in the engine control module for providing said first output signal to the engine control routines when said primary sensor is operational; and means for modifying said second output signal by said phase difference value and providing said modified second output signal to the engine control routines upon a failure of said primary sensor.

10. A sensor apparatus for sensing engine speed and timing comprising:

a dipole magnet having one sensing face at a pole of the magnet;

a primary magnetic sensor mounted on said one sensing face;

a secondary magnetic sensor mounted on said one sensing face disposed apart a fixed distance from said primary sensor;

an electrical connector disposed adjacent the opposite pole of said magnet;

a first flexible circuit connected between said first sensor and said electrical connector and extending along said magnet;

a second flexible circuit independent of said first flexible circuit and connected between said second sensor and said electrical connector;

wherein said first sensor and first flexible circuit are configured to generate a first output signal upon passage of a ferromagnetic element, and said second sensor and second flexible circuit are configured to generate a second output signal upon passage of a ferromagnetic element, said second output signal lagging said first output signal by a phase difference related to said fixed distance.

11. The sensor apparatus according to claim 10, wherein each of said flexible circuits include signal conditioning electrical components for producing a square wave output from the corresponding magnetic sensor.

12. The sensor apparatus according to claim 10, wherein each of said flexible circuits includes cladding for protection against electromagnetic interference.

13. The sensor apparatus according to claim 10, wherein each of said sensors and flexible circuits is affixed to said magnet.

14. The sensor apparatus according to claim 13, wherein said magnet is disposed within potting contained in a sensor housing.

15. The sensor apparatus according to claim 14, wherein said sensor housing includes means for mounting to a housing adjacent an engine timing wheel with said sensing face proximate to the timing wheel.

16. The sensor apparatus according to claim 15, wherein said sensor housing defines an outer groove and said apparatus includes a seal ring disposed within said groove to provide a seal between said sensor housing and the timing wheel housing.

17. A method for generating engine speed and timing information to an engine control module (ECM) comprising the steps of:

providing a sensor apparatus adjacent the timing wheel driven by the engine, the timing wheel having a plurality of spaced ferromagnetic elements each having a width, the sensor apparatus including a primary magnetic sensor and a secondary magnetic sensor, each producing corresponding output signals indicative of the passage of the ferromagnetic elements;

spacing the primary and secondary magnetic sensors apart a distance less than the width of the ferromagnetic elements;

reading the output signal from the primary sensor and determining engine speed and timing information from the primary output signal;

reading the output signal from the secondary sensor;

determining a phase difference value between the primary output signal and the secondary output signal; and upon failure of the primary sensor, applying the phase difference value to modify the output signal from the secondary sensor and determining engine speed and timing information from the modified secondary output signal.

18. The method for generating engine speed and timing information according to claim 17, wherein the step of applying the phase difference value includes subtracting the phase difference value from the secondary output signal when the primary sensor leads the secondary sensor relative to the direction of rotation of the timing wheel.

19. The method for generating engine speed and timing information according to claim 17, wherein the step of applying the phase difference value includes adding the phase difference value to the secondary output signal when the primary sensor lags the secondary sensor relative to the direction of rotation of the timing wheel.

* * * * *